United States Patent [19]

Borja et al.

[11] 4,295,003
[45] Oct. 13, 1981

[54] THREADED SCREW MOUNTING MEANS

[75] Inventors: Jesus Borja, Glenview; Jack R. Halvorsen, Mt. Prospect, both of Ill.

[73] Assignee: Illinois Tool Works Inc., Chicago, Ill.

[21] Appl. No.: 110,055

[22] Filed: Jan. 7, 1980

[51] Int. Cl.³ .............................................. H02G 3/08
[52] U.S. Cl. ...................................... 174/53; 220/3.2; 411/437
[58] Field of Search ................ 174/53; 85/36, 32 V; 151/41.74, 41.75, 41.76; 220/3.2–3.94

[56] References Cited

U.S. PATENT DOCUMENTS

| | | | |
|---|---|---|---|
| 3,955,463 | 5/1976 | Hoehn | 174/53 X |
| 4,069,448 | 1/1978 | Gernhardt | 174/58 X |
| 4,167,648 | 9/1979 | Lockwood | 174/53 |

Primary Examiner—Gene Z. Rubinson
Assistant Examiner—D. A. Tone
Attorney, Agent, or Firm—J. R. Halvorsen; T. W. Buckman

[57] ABSTRACT

This invention relates to a quick screw mounting means usable with a plastic member adapted to accept secondary elements relative thereto. The mounting means includes a bore hole open along one side formed in the mounting member and an axially extending slot substantially parallel to and communicating with said bore holes along its open side and extending laterally therefrom. A flat sheet metal clip is slid into the slot and locked therein by a head flange engaging the outer end and a pair of resilient leg members opposite the head engaging the mounting means adjacent the opposite end of the bore hole. At least one resilient arm intermediate the head and leg members extends into the bore hole to engage a screw theaded member that is axially pushed without rotation into the bore hole. The arms engage the thread and permit adjustment of the screw, as well as removal, by appropriate rotation.

14 Claims, 16 Drawing Figures

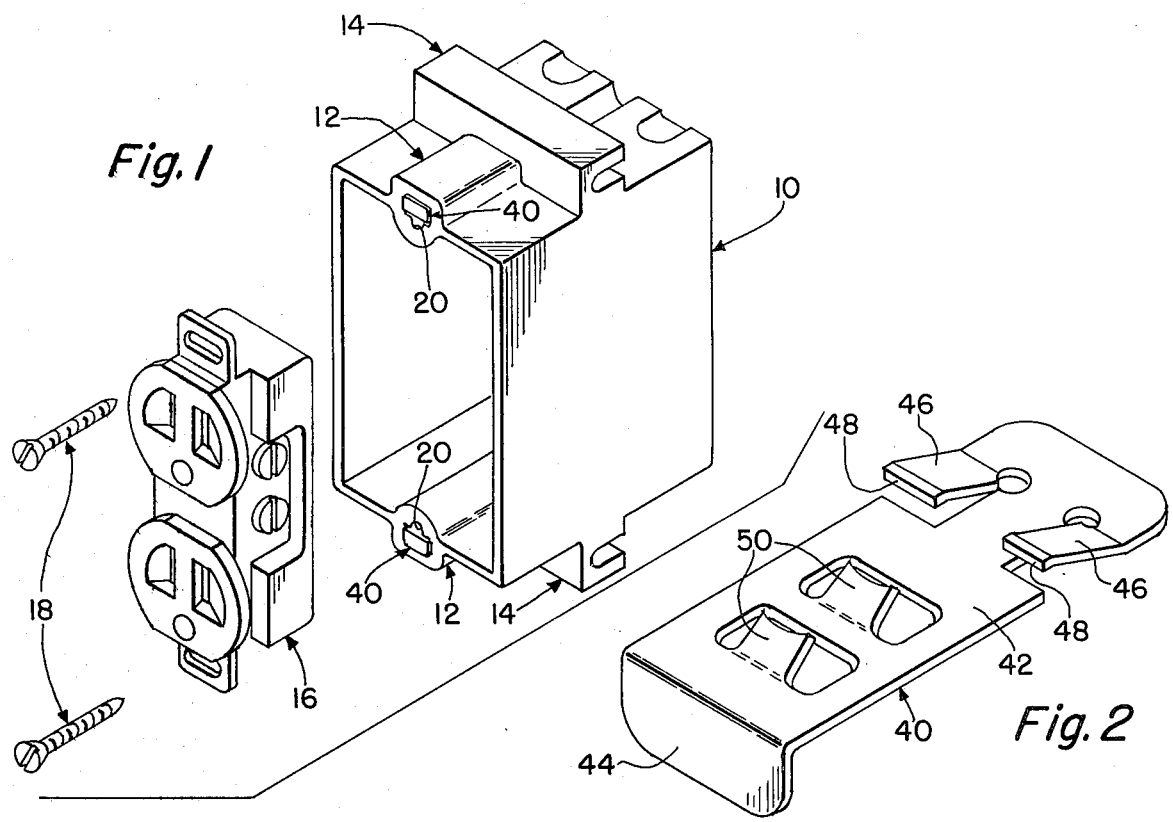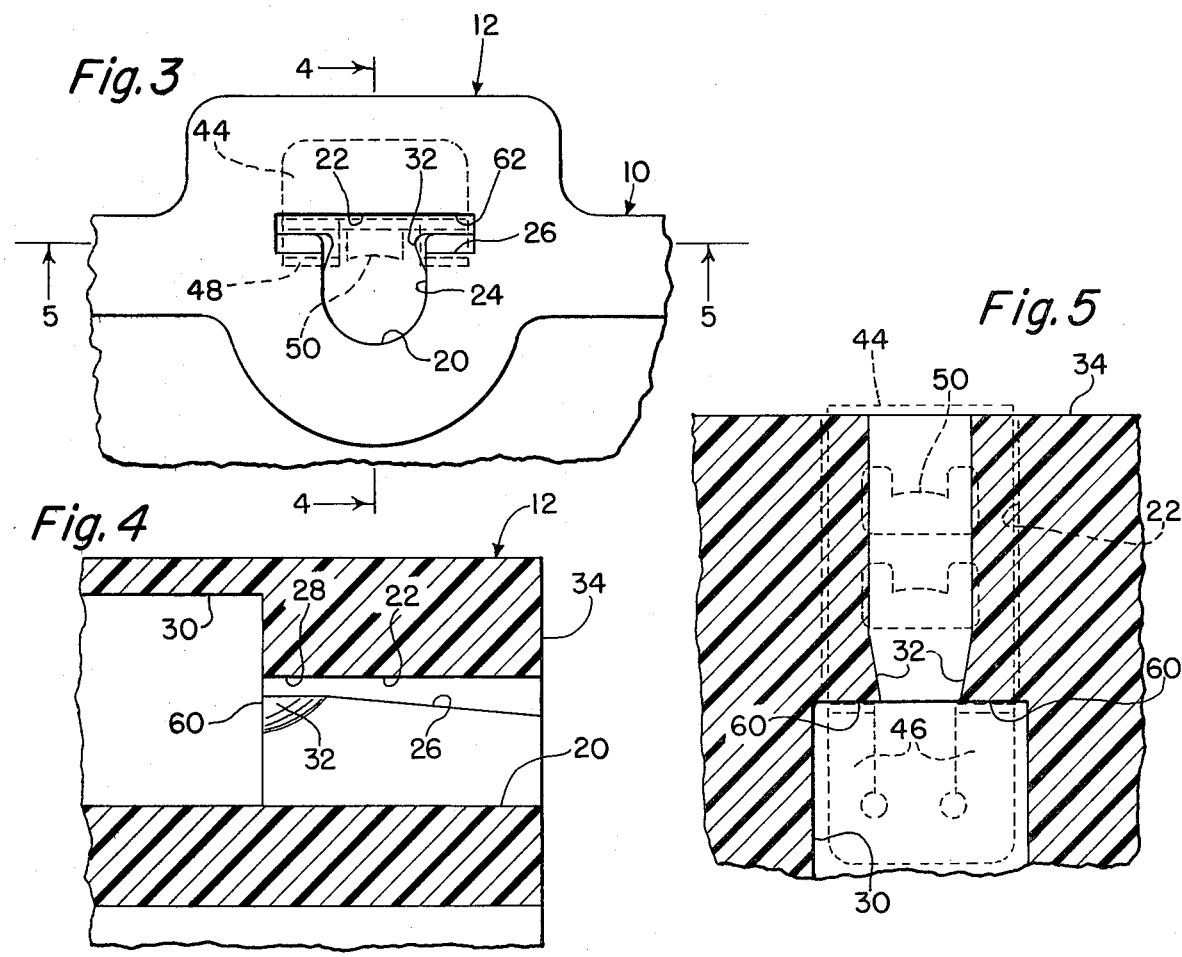

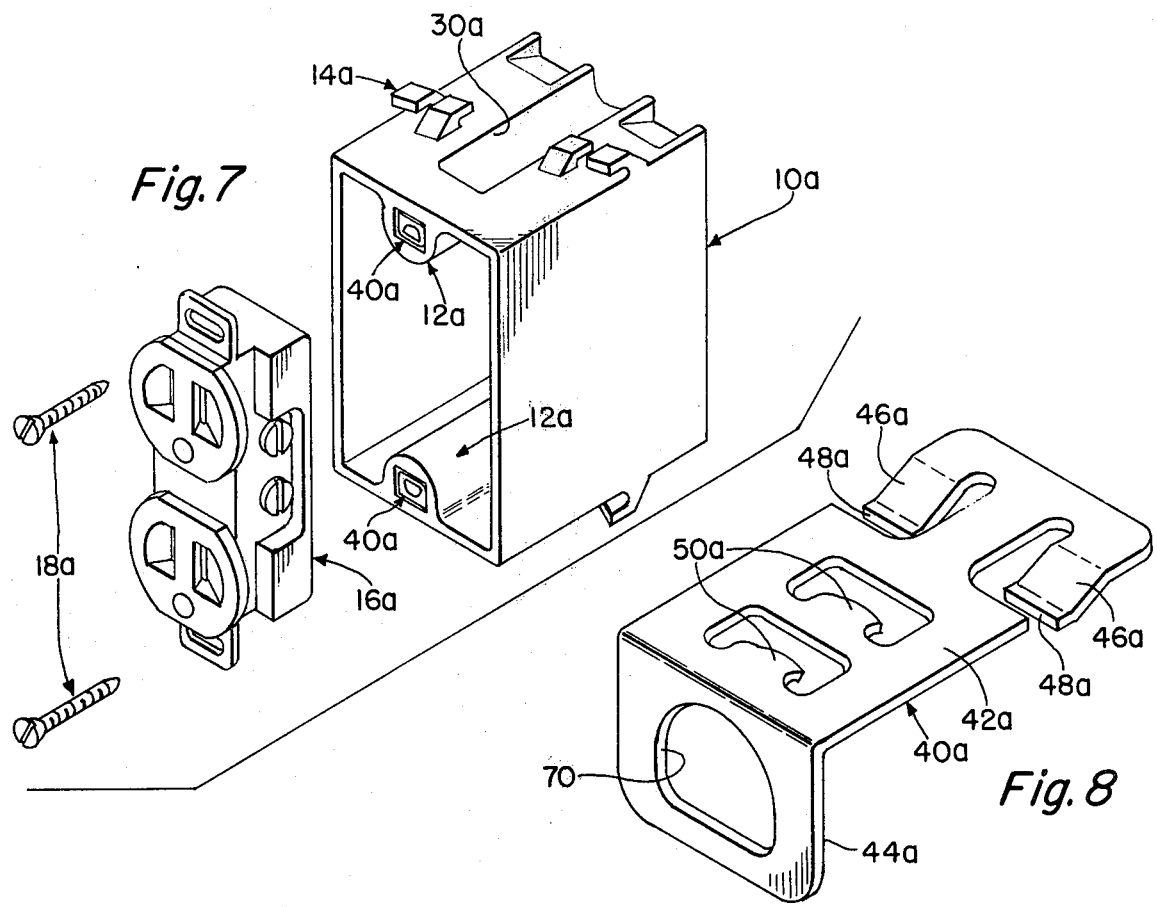
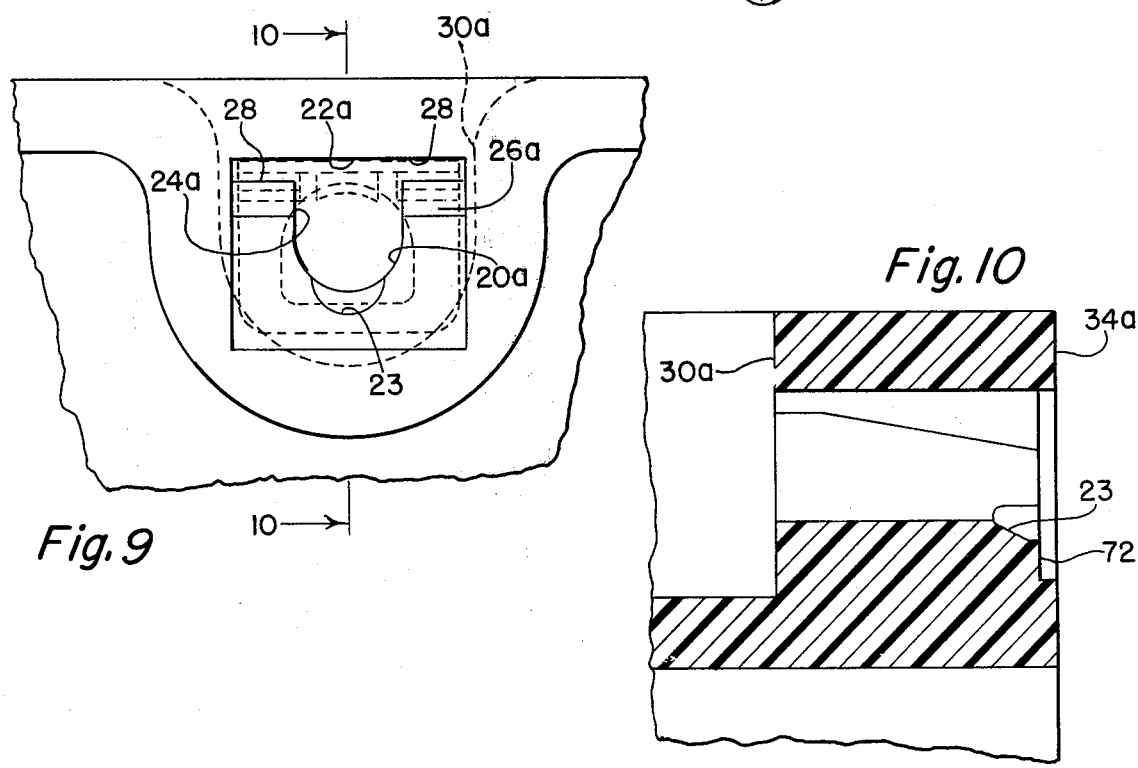

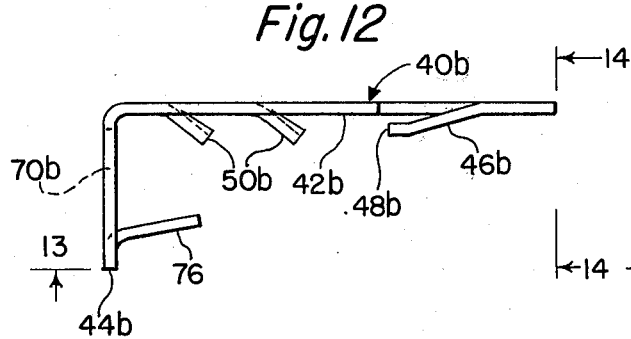
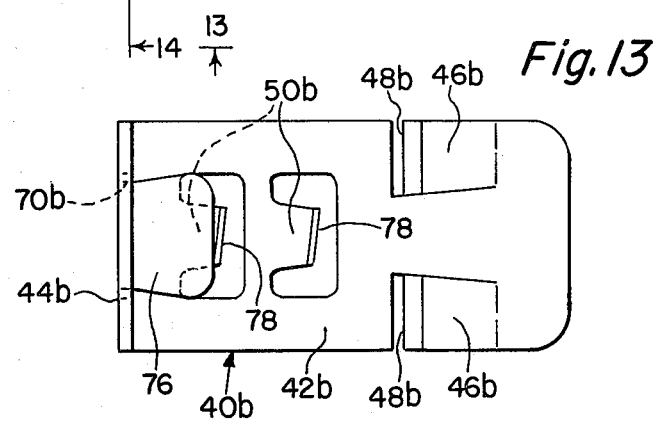
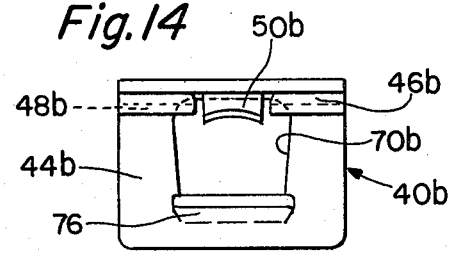
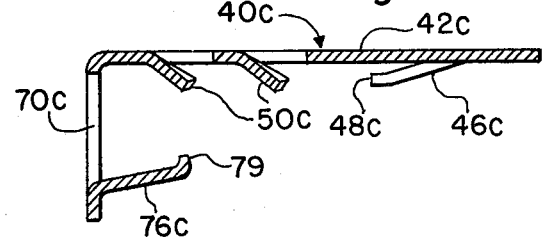
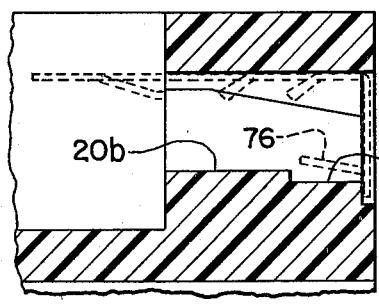
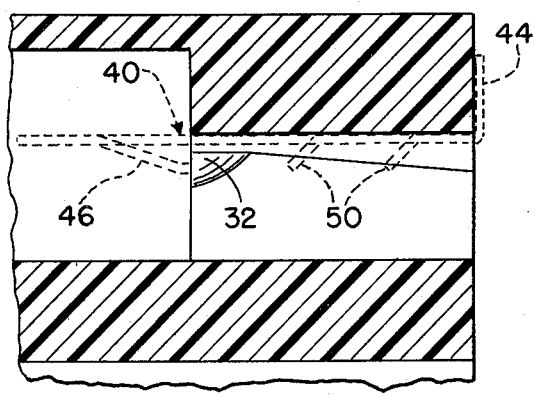
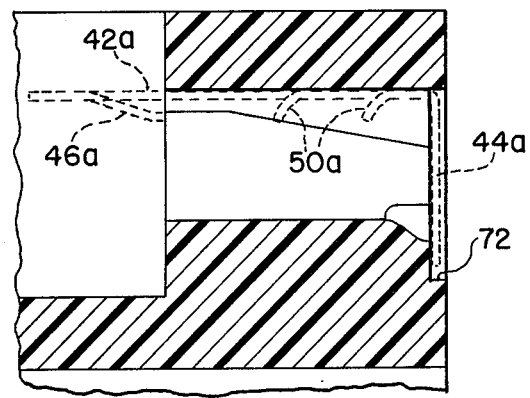

THREADED SCREW MOUNTING MEANS

BACKGROUND OF THE INVENTION

Screw mounting means of the type contemplated by the present invention are generally categorized in United States Classifications such as Class 85/36; 174/53; 151/41.76; 52/758; and 220/3.2 et seq. The general technique of providing a sheet metal clip positioned within a boss formed as part of a receptacle and adapted to accept a screw member by an axially directed blow is clearly shown in the U.S. Pat. Nos. 3,955,463 to Rudolph H. Hoehn issued May 11, 1976 and 4,105,862 issued Aug. 8, 1978. Related art can also be found in the U.S. Pat. No. 3,895,732 to Richard L. Robinson issued July 22, 1975 and U.S. Pat. No. 4,167,648 Alan C. Lockwood issued Sept. 11, 1979. While the function of the sheet metal clips shown in the above indicated references is similar to the present device, there are inherent problems with each of these clips as they relate to the clip per se as well as to the size of boss and the strength of the boss required to receive the individual clips. Such problems involve the need for added material in the boss to accept and retain the clip as well as to the complexity of the molds required to produce the particular design of bore necessary to accept a particular clip.

SUMMARY AND OBJECTS

The present invention is directed to a screw mounting means including a screw mounting member and a flat clip member both of which can be economically produced and readily assembled in a positive manner to carry out the intended function of the invention. The inherent design of the present invention is directed to an economical clip which takes advantage of the strength of materials in a particular locale and which will withstand the testing procedures of Underwriter's Laboratories for safety purposes.

It is a primary object of the present invention, therefore, to provide an economical clip which will be positively retained in a screw mounting member that can be economically produced. The economies are directed to not only to the cost of manufacture from a material and labor standpoint but the economies inherent in assembly of the two parts and the usage of the assembly in the field by an installer.

A further object is to provide a reusable, strong, permanently installed clip having its retaining means so positioned as to take advantage of the strongest portions of the mounting member as well as acknowledging the inherent characteristics of the spring clip when associated with a screw threaded member.

A further object of the present invention is to provide means for preventing destruction of the screw mounting member by the screw threaded member in its use by shielding the screw mounting member basic material from the threaded member.

Other objects will be apparent to those skilled in the art when the drawings are viewed in conjunction with the detailed specification.

BRIEF DESCRIPTION OF THE DRAWINGS

FIG. 1 is an exploded perspective view of the environment in which the present invention may be used, namely, a receptacle box for use with electrical outlets;

FIG. 2 is a perspective view of one embodiment of the type of clip contemplated by the present invention;

FIG. 3 is a partial plan view showing the arrangement of the bore hole and slot in the boss of the receptacle shown in FIG. 1 as viewed from the open end of the receptacle box;

FIG. 4 is a partial sectional view taken along line 4—4 of FIG. 3;

FIG. 5 is a partial sectional view taken along line 5—5 of FIG. 3;

FIG. 6 is a partial sectional view similar to FIG. 4 showing a clip of the type shown in FIG. 2, in phantom, installed relation;

FIG. 7 is an expanded perspective view of a second embodiment of the present invention showing a different environment, namely, a different receptacle box;

FIG. 8 is a perspective view of the type of clip used with the second embodiment of the present invention;

FIG. 9 is an enlarged plan view of the boss shown in FIG. 7 as viewed from the open end of the box;

FIG. 10 is a partial sectional view as taken along line 10—10 of FIG. 9;

FIG. 11 is a partial sectional view substantially identical to FIG. 10 showing the clip of FIG. 8, in phantom, in installed position;

FIG. 12 is a side view of a third clip embodiment of the present invention;

FIG. 13 is a plan view taken along line 13—13 on FIG. 12;

FIG. 14 is an end view of the same clip taken along line 14—14 of FIG. 12;

FIG. 15 is a partial sectional view in side elevation of a further modification to the embodiment of FIG. 12; and FIG. 16 is a partial sectional view of a bore adapted to accept the clip of the type shown in either FIG. 12 or FIG. 15.

DETAILED SPECIFICATION

Referring now to the drawings, wherein similar parts are designated by similar numerals, a threaded screw mounting means of the type contemplated by the present invention can be used in the environment of an electric outlet box 10 having a boss 12 located and integral with opposite end walls of the box 10. Such a box is provided with suitable means 14 for acceptance of nails or other fasteners to retain same relative to a stud structure in a building. The box 10 is adapted to further accept a receptacle 16 which is secured by screws 18 at opposite ends in a threaded screw mounting means of the type contemplated by the present invention.

The screw mounting means includes a screw mounting member, which in the present instance is the boss 12 having a predetermined internal configuration. This includes a bore hole 20 formed in the mounting member and open along one side to communicate with an axially extending slot 22 that communicates with the bore hole along its one open side and extends laterally thereof. In the present instance the bore hole has a generally D-shaped configuration being curved at one end and having parallel side walls 24 which extend to the open end. The slot 22 may be tapered from its outer open end as shown at 26 to a point spaced from the opposite end where the slot walls 28 are parallel and open, along with the bore hole 20, into a counterbore 30. This provides an abrupt shoulder means at the end of the bore hole and slot for purposes best set forth hereinafter. The bore hole may, if desired, include a reinforcing portion 32 which tapers downwardly and inwardly into the bore hole 20 from the side walls 24 adjacent the juncture with the slot 22, for purposes as best set forth hereinafter.

Acceptable within a slot and bore hole configuration of the type described above is a metal clip 40. The clip 40 has a substantially flat body portion 42 that is complementary to and slidably received within slot 22. A laterally extending flange head 44 is provided at one end and extends perpendicularly to the flat body portion 42. At the opposite end a pair of yieldable leg members 46 are struck from the edges of body 42 and extend outwardly in the direction of the head 44 but on the opposite side of the plane of the body 42. The yieldable leg members 46 have shoulder means 48 spaced from the head 44 a distance approximately equal to the distance from the outer end 34 of the screw mounting means and the counterbored shoulder means 30 at the opposite end of bore hole 20. Intermediate the head 44 and the shoulders 48 are one or more yieldable arms 50 extending from the plane of the flat body 42 in the same direction, but in opposition to, the legs 46. The free end of the arms 50 can be flat or if desired curved to better engage the threads of the screws 18.

A clip 40 is slid into slot 22 with the arms 50 projecting into the bore hole 20 and is pushed inwardly until the head engages the outer surface 34 with the legs 46 being bent into the plane of the body 42 as it progresses down the taper portion 26 until the legs 46 and their associated shoulders 48 reach the counterbored shoulder portion 60. At this time the legs 46 snap outwardly and the shoulders 48 will abut the area 60 adjacent to the mouth of the bore hole 20 and adjacent the lateral extensions 62 of the slot 22. The tapered portions 32 serve to better buttress this material to insure firm positionment of the shoulders 48 with the head 44 resting on the outer surface 34, thereby locking the clip 40 against movement in either direction.

When the electrical receptacle 16 is positioned adjacent to box 10, the screws 18 can be inserted through the aperture flanges at the end of receptacle 16 and driven, as by a hammer, into the bore hole 20. The resilient yieldable arms 50 move out of the way as by ratcheting along the screw threads and then bite into upon completion of the blow the threads at a particular location. The screw 18 can then be adjusted for final tightening by rotation or can be removed by rotation in the normal fashion of a screw and nut.

As can be seen in FIGS. 3, 5 and 6, this embodiment of the invention contemplates a flat wall along the backside of the slot which insures rigid backup to the spring metal member 42 with the tapered portion of the slot 26 permitting limited movement of the device to account for and permit the flexibility of the arms 50 as they are depressed during the axial driven insertion of the screw 18. The reinforcements or buttresses 32 provide added material to reinforce the thick sections adjacent the bore hole side walls 24 that are engaged by the shoulder means 48. This insures increased strength to the phenolic resin box 10 when the shoulders 60 are contacted by the shoulder means 48.

Referring now to FIGS. 7 through 11 wherein similar parts are designated by similar numerals with the addition of the suffix "a", the receptacle box 10a is substantially similar to the first embodiment with the possible exception that the boss 12a is located interiorally of the box 10a providing flat outer walls thereto having only the mounting means 14a extendng outwardly beyond the end walls. The boss 12a in this embodiment is much shorter in axial length and the counterbore 30a is exposed to the exterior of the box 10a for ease in molding. While the first box was a thermoformed phenolic resin box; it is contemplated that the present embodiment is for use with a thermoplastic box which is injection molded rather than thermoformed.

The bore hole 20a and the associated slot 22a of this embodiment are substantially identical to that previously described in that slot 22a includes a tapered portion 26a converging from the open end towards the opposite end to provide parallel wall portions 28a that extend laterally from the side walls 24a. In this embodiment a relief portion 23 is provided for purposes of guiding the screw 18a into its mounted position.

The clip used in the present embodiment is similar to the first embodiment, namely, that the clip 40a includes a flat body portion 42a; a pair of resilient legs 46a struck from one end thereof and a head member 44a extending in the same direction from the plane of the body 42a as do the resilient legs 46a. Intermediate the head 44a and the legs 46a are one or more resilient arms 50a struck from the margins of the clip 40a for purposes of extending into the bore hole 20a to contact and engage a screw 18a driven thereinto. The head 44a, in this embodiment, is provided with an aperture 70 for overlying the bore hole 20a, as seen in phantom in FIG. 9, and for acceptance of the screw 18a therethrough. In this embodiment the outer end 34a of the screw mounting member may be recessed as at 72 to accept the head 44a in flush relationship with the outer end 34a. This can be best seen in FIG. 11 wherein the head is positioned within the recess 72 and has sufficient room to move for variations in screw tolerances as well as movement of the clip during insertion of the screw when the resilient arms 50a are moved inwardly until the screw is in mounted position. Use of this device is similar to the first embodiment in that the screws 18a can be driven axially by a hammer blow until approximate final location is established at which time rotation of the screws 18a will permit final adjustment or removal by appropriate rotation.

Referring now to a third embodiment of the present invention, wherein similar numerals will be utilized for similar parts with the addition of the suffix "b", the clip of this embodiment is substantially identical to that shown in FIG. 8 in that it includes a flat body portion 42b a pair of resilient leg members 46b struck from adjacent one end of the body 42b and one or more resilient arms 50b extending angularly from the body portion 42b in opposition to the shoulders 48b of the legs 46b. A head 44a extends in the same direction from the plane of the body 42b as do the legs 46b and the arms 50b. The head 44b is provided with an aperture 70b but differs from the previous embodiment in that the material struck from the head 44b to form the aperture 70b is retained and extends axially in the same direction as body portion 42b to form a reinforcing member 76 spaced from the body portion 42b. It has been found that certain types of thermoplastic materials will be dug into by the screw 18 when inserted and subjected to the spring pressure of the arms 50b. The reinforcing member 76 urges the screw into engagement with the arms 50b for positive retention thereby as well as preventing the screw from digging into the plastic material from which the associated box is manufactured.

Two other features of this particular embodiment are the fact that the legs 46b are wider at their free end than at their point of juncture to the body portion. This helps prevent tangling of the parts when they are manufactured in bulk form. A further feature of this embodiment is the fact that the ends 78 of the resilient arms 50b are disposed angularly relative to the axis as well as the body of the arms 50b being transversely curved. The angular disposition of the ends 78 is approximately the same as the helix angle of the screw 18 with which it is to be associated. It has been found that this configuration permits only a predetermined amount of torque to be applied to the screw 18 with which it is to be associated. It has been found that when the predetermined desired torque is reached that by controlling the spring characteristics of the arms 50b it is possible to ride up the side flanks of the screw thread and thereby release the screw to the next turn of the helix. This prevents over torquing of the screw and insures correct location of the workpiece or receptacle 16 in relationship to the box.

A further modification of the present invention is shown in FIG. 15 wherein similar parts will be designated by similar numerals with the addition of the suffix "c". In this embodiment the reinforcing member 76c includes a coined or formed free end 79 which is capable of engaging screw threads in the same fashion as the resilient arms 50c.

In those instances where the reinforcing members 76 is utilized, it has been found desirable to recess the outer end of the bore hole 20b with a generally flattened portion or recess 80 to accept the reinforcing member 76, as best seen in FIG. 16.

It will be appreciated by those skilled in the art that while the bore hole 20 has been shown in the various embodiments as a generally D-shaped configuration there is no reason that other shapes such as rectangular or square could not also be used with equal facility.

By having the legs and arms of the clip extend in a common direction, inherent advantages are established in the feeding and orientation of such clips for insertion by automatic equipment and well as providing simplicity in manual installation within the slot and bore hole of the mounting member. The heat treat characteristics appear to be desirable in this configuration and clips of this nature in all of the embodiment forms have passed the Underwriter's Laboratories Inc. shock tests which require that the screw be inserted and removed a multiplicity of times and then a weight shock be applied to the screw to determine whether it will pull out of the bore hole while acting against the clip.

It has also been found that the embodiments shown in FIGS. 8 through 16 which have the head 44a provided with aperture 70 overlying the bore hole gives a secondary advantage. When these boxes 10 are installed they are often partially covered by drywall material and plaster-like taping compound. When the electricians return to pull wires into the box and install the receptacle they must remove the excess tape and plaster from the mouth of the box and its associated bore hole and clip. The tool most often used to accomplish this operation is a pair of long nose pliers. The restricted opening formed by aperture 70 prevents the pliers from entering the bore hole and causing damage to the screw engaging arms 50.

Other modifications will be apparent to those skilled in the art.

I claim:

1. A threaded screw mounting means including:
a screw mounting member;
a generally D-shaped bore hole open along its flat side formed in said mounting member;
an axially extending slot substantially parallel to and communicating with said D-shaped bore hole along said open flat side and extending laterally therefrom;
a substantially flat clip member complementary to and slidably received within said slot, said clip member including:
substantially planar head means at one end extending perpendicularly to the plane of the flat clip,
at least two yieldable arms struck from said clip member and extending angularly into said bore hole along said open flat side in a direction away from said head,
a pair of spaced yieldable leg members struck from adjacent the opposite edges of said clip and providing shoulder means in spaced opposition to said head, said leg members extending outwardly from the same side of the plane of said clip member as said at least two yieldable arms extend,
said slot and bore having a coterminous predetermined axial extent whereby when said clip member has been fully inserted said head bears against the outer one end of said mounting member and said leg members which flex during insertion into said slot snap outwardly after passage through said slot and bear against said mounting member adjacent said bore hole at its end opposite said outer end in locking engagement,
said at least two yieldable arms being deflectable when a screw threaded member is axially pushed into said bore hole from the outer end and engages said thread against retrograde axial movement while permitting adjustment of the screw, as well as removal, by appropriate rotation, said mounting member being counterbored adjacent said opposite end of said bore hole and slot to form abrupt shoulder means at said opposite end at least adjacent said slot and on opposite sides of said bore hole, said slot being tapered from said outer end toward said opposite end and terminating in parallel walls spaced apart a distance substantially equal to the effective thickness of said clip member for a limited axial distance adjacent the point where said slot communicates with said counterbore, said limited axial distance of said parallel walls gripping said clip member only in the region axially intermediate said yieldable arms and legs.

2. A device of the type claimed in claim 1 wherein said head extends laterally in a direction opposite to said yieldable arms and legs.

3. A device of the type claimed in claim 1 wherein said bore hole at its opposite end includes a pair of tapered means that extend axially and inwardly into said bore hole adjacent its juncture to said slot and generally in a plane coincident with said shoulder means, thereby to reinforce and increase the area of said mounting means available for engagement by said yieldable leg members.

4. A threaded screw mounting means including:
a screw mounting member;
a generally D-shaped bore hole open along its flat side formed in said mounting member;
an axially extending slot substantially parallel to and communicating with said D-shaped bore hole along said open flat side and extending laterally therefrom;

a substantially flat clip member complementary to and slidably received within said slot, said clip member including:

substantially planar head means at one end extending perpendicularly to the plane of the flat clip, at least two yieldable arms struck from said clip member and extending angularly into said bore hole along said open flat side in a direction away from said head, a pair of spaced yieldable leg members struck from adjacent the opposite edges fo said clip and providing shoulder means in spaced opposition to said head, said leg members extending outwardly from the same side of the plane of said clip member as said at least two yieldable arms extend, said slot and bore having a coterminous predetermined axial extent whereby when said clip member has been fully inserted said head bears against the outer one end of said mounting member and said leg members which flex during insertion into said slot snap outwardly after passage through said slot and bear against said mounting member adjacent said bore hole at its end opposite said outer end in locking engagement, said at least two yieldable arms being deflectable when a screw threaded member is axially pushed into said bore hole from the outer end and engages said thread against retrograde axial movement while permitting adjustment of the screw, as well as removal, by appropriate rotation, said head further including a screw accepting aperture and said head extending laterally from the plane of said flat clip member in the same direction as said yieldable arms and legs, said head including reinforcing means spaced from and extending substantially axially in the same direction as said flat clip member, said reinforcing means acceptable within said bore hole and insuring engagement of said screw threaded member with said yieldable arms by preventing said screw member from digging into the material forming said mounting means bore hole.

5. A device of the type claimed in claim 4 wherein said mounting means includes a recess at said one end to complementarily accept said head.

6. A device of the type claimed in claim 5 wherein said bore hole is relieved at said outer end to assist in the introduction of said screw threaded member.

7. A device of the type claimed in claim 4 wherein said reinforcing means is provided with screw engaging means in spaced opposition to said yieldable arms.

8. A device of the type claimed in claim 7 wherein said reinforcing means is integrally connected at one end to said head, the opposite free end being work formed for intimate engagement with said screw thread.

9. A device of the type claimed in claim 4 wherein said reinforcing means is struck from within the margins of said head and forms a substantial portion of the material removed to form the aperture in said head.

10. A device of the type claimed in claim 4 wherein said D-shaped bore hole is relieved or flattened in at least a portion of its curved portion adjacent said outer end to thereby accept a substantially flat reinforcing means.

11. A device of the type claimed in claim 1 or claim 4 wherein said mounting means is integral with at least one wall of an open mouth generally rectangular box.

12. A device of the type claimed in claim 1 or claim 4 wherein said yieldable legs are wider at their free end facing toward said head than at their attachment to the clip adjacent said opposite end.

13. A device of the type claimed in claim 1 or claim 4 wherein the free ends of said at least two yieldable arms are angled relative to the longitudinal axis of said clip, said angle approximating the helix angle of the screw threaded member to be associated therewith.

14. A device of the type claimed in claim 1 or claim 4 wherein the free ends of said at least two yieldable arms are transversely curved to insure greater thread engagement with said screw threaded member with which it is to be associated.

* * * * *